Patented Nov. 11, 1952

2,617,837

UNITED STATES PATENT OFFICE 2,617,837

TERTIARY-OCTYLATED BIPHENYLS

Gerald H. Coleman, Freeland, and Raymond H. Rigterink, Midland, Mich., assignors to The Dow Chemical Company, Midland, Mich., a corporation of Delaware No Drawing. Application September 30, 1950, Serial No. 187,836

9 Claims. (Cl. 260—668)

This invention concerns certain new biphenyl derivatives and a method of making the same.

The biphenyl derivatives provided by the invention are tertiary-octylated biphenyls having from one to three tertiary-octyl radicals, i. e. 1,1,3,3-tetramethylbutyl radicals, as the only substituents on the biphenyl nuclei, and mixtures comprising the same. They have the general formula:

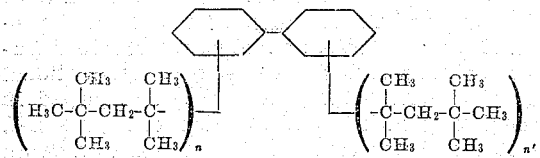

wherein $n$ and $n'$ are integers having individual values of from 0 to 2 and having a sum of from 1 to 3. In most instances, the products are initially obtained as a liquid mixture of isomeric and homologous tertiary-octylated biphenyls. The homologous compounds may be separated from one another by fractional distillation, e. g. to obtain a liquid fraction of isomeric mono-tertiary-octyl-biphenyls, a higher boiling liquid fraction of isomeric di-(tertiary-octyl) biphenyls, and a still higher boiling liquid fraction of tri-(tertiary-octyl) biphenyls, etc. In some instances individual tertiary-octylated biphenyls may be isolated, e. g. by careful fractional distillation, or by fractional crystallization, etc. However, the products comprising a liquid mixture of isomeric mono-, di-, or tri-tertiary-octylated biphenyls, or of isomers of all three such compounds together, as the principal ingredients are well suited for use as plasticizers for thermoplastic resins and are usually employed as such.

The tertiary-octylated biphenyls provided by the invention are particularly adapted for use as plasticizers for cellulose ether molding compositions. It is important that the cellulose ethers, especially the ethyl- and higher alkyl-ethers of cellulose, be plasticized prior to molding, since otherwise it is difficult, if not impossible, to produce well-shaped and accurately dimensioned moldings without heating the cellulose ethers to temperatures at which they are discolored and partially decomposed. There are a considerable number and variety of plasticizers known which may be incorporated with ethyl cellulose to permit ready and accurate molding, but nearly all of them, when used in amount sufficient for the purpose, soften the ethyl cellulose to an extent such that the molded articles are easily scratched or marred. Also, most of the known plasticizers, when used in amount permitting ready molding, seriously reduce the tensile strength, or impair other mechanical properties of ethyl cellulose.

The mono-, di- and tri-tertiary-octylated biphenyls of the invention are highly effective as plasticizers for ethyl cellulose and do not cause excessive softening of the latter at room temperature. They can be incorporated with ethyl cellulose, or other alkyl ethers of cellulose, to obtain compositions which may be molded readily without decomposition to form articles of good appearance which are strong, hard and mar-resistant at room temperature. They contribute to the desirable properties of such molding composition in a number of respects, e. g. by lowering the temperature required for molding, by increasing the rate of flow at a given molding temperature and pressure and by permitting ready ejection of the molded articles from molds without marring. They also contribute to the mechanical properties of the molded articles, e. g. the impact strength and the per cent elongation value, etc.

The tertiary-octylated biphenyls are made by reacting diisobutylene with biphenyl in the presence of a Friedel-Crafts catalyst, e. g. aluminum chloride, aluminum bromide, or boron trifluoride, etc. Aluminum chloride is usually employed as the catalyst in amount corresponding to from 2 to 5 per cent of the weight of the biphenyl, but it may be used in smaller or larger proportions. From one to two molecular equivalents of diisobutylene are preferably employed per mole of biphenyl, but smaller or much larger proportions, e. g. from 0.5 to 4 molecular equivalents, or diisobutylene can be used. The reaction is carried out at temperatures such as to liquefy the reaction mixture and not higher than 100° C. At higher temperatures, the diisobutylene, or the tertiary octyl radicals, tend to undergo decomposition in the presence of the catalyst with resultant introduction of tertiary-butyl groups into the products. The reaction is usually conducted at temperatures between 70° and 100° C., preferably between 70° and 90° C., but lower temperatures can be used, e. g. after the reaction is started.

In practice, the biphenyl is melted, the catalyst added, and the diisobutylene is gradually introduced while stirring and warming the mixture. When conducted at temperatures between 70° and 80° C. using aluminum chloride as the catalyst, the reaction is usually complete in less than 4 hours. The mixture is then cooled and the catalyst is destroyed or removed, e. g. by treatment with alkali, or by washing with water, an aqueous alkali solution, or an aqueous acid solution, etc. When employing the reactants in the preferred proportions hereinbefore stated, the product consists for the most part of mono- and di-tertiary-octylated biphenyls, but contains a minor amount of tri-tertiary-octylated biphenyl together with unreacted biphenyl and/or diisobutylene. It may be dried and employed directly as a plasticizer, but is preferably first distilled to remove unreacted starting materials and to separate the mono-, di- and tri-tertiary-octylated biphenyls from one another or from any higher boiling by-products.

The mono-, di- and tri-tertiary-octylated biphenyl products may be incorporated, e. g. on compounding rolls, with ethyl cellulose or other cellulose ethers to obtain molding compositions of good quality. Such molding compositions usually contain from 15 to 30 per cent by weight of tertiary-octylated biphenyl, but the latter may be present in smaller or larger proportions.

Although particularly adapted for use as plasticizers for cellulose ethers, the tertiary-octylated biphenyl products may also be employed for other purposes, e. g. as plasticizers for other organic thermoplastics such as polymerized methylmethacrylate, or the rubbery copolymers of styrene and butadiene, etc., or as organic solvents.

The following examples describe ways in which the principle of the invention has been applied and illustrate certain of its advantages, but are not to be construed as limiting the invention.

EXAMPLE 1

A mixture of 925 grams (6 moles) of biphenyl and 20 grams of anhydrous aluminum chloride was heated to between 70° and 80° C. Approximately 673 grams (6 moles) of diisobutylene was added dropwise and with stirring over a period of 2.5 hours while maintaining the mixture at temperatures of from 70° to 75° C. After adding the diisobutylene, the mixture was stirred and maintained at from 70° to 75° C. for 1¼ hours. It was then washed thoroughly with water and fractionally distilled. The following fractions were collected as the principal products.

EXAMPLE 2

Approximately two molecular equivalents of diisobutylene and one mole of biphenyl were reacted together in the presence of aluminum chloride and the mixture was washed with water and fractionally distilled, as in Example 1. The results were similar to those obtained in Example 1, except that approximately equal weights of mono-tertiary-octylated biphenyl and di-tertiary-octylated biphenyl were obtained as the principal products, tritertiary-octylated biphenyl being obtained in minor amount.

EXAMPLE 3

The three tertiary-octylated biphenyl products obtained in Example 1 were separately tested as plasticizers for ethyl cellulose. In each experiment, one part by weight of the tertiary-octylated biphenyl and four parts of ethyl cellulose were admixed and the mixture was warmed preparatory to milling the same on heated compounding rolls until substantially uniform. All of the mixtures withstood the heating and milling operations without becoming decomposed or darkened appreciably. Each of these compositions, after being rendered homogeneous, was injection molded to form well dimensioned test bars of good appearance. The test bars were used to determine the tensile strength, the per cent elongation value, the impact strength both at 25° C. and at −18° C., the heat distortion temperature and the hardness of each molded material by standard test methods. The Izod impact strength was measured in conventional manner, except that the test bar employed in the determination had dimensions of 2½ x ½ x ¼ inches and was transversely notched to a depth of 0.015 inch across its ¼ inch edge at the midpoint in the length of the bar. In the test, it was struck on the notched edge. The heat distortion temperature was determined by the procedure of A. S. T. M. bulletin 134 37–41 (1945) using a test bar having dimensions of 2⅛ x ¼ x ¼ inches. The test bars used in determining the tensile strength and the per cent elongation value (i. e. the per cent of its original length by which a bar could be stretched before breaking) were approximately 7 inches long and of ½ inch x ⅛ inch rectangular cross section. Hardness was determined as Rockwell hardness on the R scale. The following table identifies the tertiary-octylated biphenyl, which was tested as a plasticizer in each experiment, by giving the distillation temperature range of the same. The table lists properties which were determined for moldings

*Table I*

| Product No. | Distilling Range | Wt. in gms. | Description |
|---|---|---|---|
| 1 | 083–191° C./5 mm | 273 | Principally monotertiary-octylated biphenyls; light yellow liquid; density of 0.944 at 33° C.; $n_D^{25}=1.5559$. |
| 2 | 211–220° C./3 mm | 155 | Principally di-tertiary octylated biphenyls; light yellow, viscous liquid; density of 0.932 at 33° C.; $n_D^{25}=1.5468$. |
| 3 | 240° C./3 mm. to 255° C./1 mm. | 91 | Principally tritertiary-octylated byphenyls; highly viscous yellow liquid; density of 0.923 at 33° C.; $n_D^{25}=1.5375$. | of each of the plasticized ethyl cellulose compositions.

Table II

| Run No. | Distilling Range of Plasticizer | Properties of Plasticized Ethyl Cellulose Moldings | | | | | |
|---|---|---|---|---|---|---|---|
| | | Tensile Strength lbs./sq. in. | Percent Elongation | Impact Strength as inch-lbs./sample— | | Heat Distortion, Temp., °C. | Hardness |
| | | | | at 25° C. | at −18° C. | | |
| 1 | 183–191° C./5 mm | 4,991 | 9.7 | 3.5 | 1.0 | 56 | 90 |
| 2 | 211–220° C./3 mm | 6,063 | 9.8 | 3.1 | 0.8 | 62 | 94 |
| 3 | 240° C./3 mm. to 255° C./1 mm | 6,127 | 9.6 | 2.3 | 0.6 | 65 | 107 |

Other modes of applying the principle of the invention may be employed instead of those explained, change being made as regards the products herein disclosed, provided the compound or compounds stated by any of the following claims or the equivalent of such stated compound or compounds be employed.

We therefore particularly point out and distinctly claim as our invention:

1. Tertiary-octylated biphenyl wherein every tertiary-octyl radical is the 1,1,3,3-tetramethylbutyl radical, which tertiary-octylated biphenyl contains at least 50 per cent by weight of at least one of the compounds monotertiary-octyl-biphenyl and di-tertiary-octyl-biphenyl.
2. A mono-(1,1,3,3-tetramethylbutyl) biphenyl.
3. A di-(1,1,3,3-tetramethylbutyl) biphenyl.
4. A tri-(1,1,3,3-tetramethylbutyl) biphenyl.
5. A mixture of isomeric mono-(1,1,3,3-tetramethylbutyl) biphenyls.
6. A mixture of isomeric di-(1,1,3,3-tetramethylbutyl) biphenyls.
7. A mixture of isomeric tri-(1,1,3,3-tetramethylbutyl) biphenyls.
8. A method of making tertiary-octylated biphenyls, wherein every tertiary-octyl radical is the 1,1,3,3-tetramethylbutyl radical, which method comprises reacting diisobutylene with biphenyl in liquid phase and in the presence of a Friedel-Crafts catalyst at reaction temperatures below 100° C.
9. A method, as described in claim 8, wherein from 1 to 2 molecular equivalents of diisobutylene and one mole of biphenyl are reacted together.

GERALD H. COLEMAN.
RAYMOND H. RIGTERINK.

REFERENCES CITED

The following references are of record in the file of this patent:

UNITED STATES PATENTS

| Number | Name | Date |
|---|---|---|
| 2,172,391 | Krase | Sept. 12, 1939 |
| 2,491,120 | Loane et al. | Dec. 13, 1949 |